(12) United States Patent
Tanaka et al.

(10) Patent No.: US 12,300,796 B2
(45) Date of Patent: May 13, 2025

(54) BATTERY PACK

(71) Applicant: SUBARU CORPORATION, Tokyo (JP)

(72) Inventors: Yuichi Tanaka, Tokyo (JP); Kazuki Furuta, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 595 days.

(21) Appl. No.: 17/699,397

(22) Filed: Mar. 21, 2022

(65) Prior Publication Data

US 2022/0320623 A1   Oct. 6, 2022

(30) Foreign Application Priority Data

Mar. 30, 2021 (JP) ................................. 2021-056967

(51) Int. Cl.
| | |
|---|---|
| *H01M 10/633* | (2014.01) |
| *B60L 1/00* | (2006.01) |
| *B60L 58/26* | (2019.01) |
| *B60L 58/27* | (2019.01) |
| *H01M 10/613* | (2014.01) |
| *H01M 10/625* | (2014.01) |
| *H01M 10/6556* | (2014.01) |

(Continued)

(52) U.S. Cl.
CPC ........... *H01M 10/633* (2015.04); *B60L 1/003* (2013.01); *B60L 58/26* (2019.02); *B60L 58/27* (2019.02); *H01M 10/613* (2015.04); *H01M 10/625* (2015.04); *H01M 10/6556* (2015.04); *H01M 10/6563* (2015.04); *B60K 1/04* (2013.01); *B60K 2001/0422* (2013.01); *B60K 2001/0433* (2013.01); *H01M 2220/20* (2013.01)

(58) Field of Classification Search
CPC ............. H01M 10/613; H01M 10/625; H01M 10/6556; B60L 58/27
See application file for complete search history.

(56) References Cited

U.S. PATENT DOCUMENTS 5,055,656 A * 10/1991 Farah ................ H02J 7/007194
                                                  219/209
5,490,572 A    2/1996 Tajiri et al.
(Continued)

FOREIGN PATENT DOCUMENTS

JP     H09-259940 A     10/1997
JP     2011207321 A  * 10/2011

*Primary Examiner* — Christopher P Domone
*Assistant Examiner* — Julia Marie Fehr
(74) *Attorney, Agent, or Firm* — Smith, Gambrell & Russell, LLP

(57) ABSTRACT

A battery pack to be mounted on a vehicle includes a battery, a passage unit, a gas pump, a first valve, and an arithmetic and control unit. The passage unit is disposed on at least one of sides of the battery. The passage unit allows fluid to flow through an inside of the passage unit. The gas pump operates with electric power of the battery. The gas pump draws gas in the inside of the passage unit. The first valve shuts off a fluid passage through which the gas is to be supplied to the inside of the passage unit. The arithmetic and control unit controls the gas pump and the first valve, and performs a first temperature regulating process. The process includes driving the gas pump while the first valve is not shut off, and then drawing the gas from the inside of the passage unit.

21 Claims, 9 Drawing Sheets

(51) Int. Cl.
*H01M 10/6563* (2014.01)
*B60K 1/04* (2019.01)

(56) References Cited

U.S. PATENT DOCUMENTS

| | | | |
|---|---|---|---|
| 2013/0004808 A1* | 1/2013 | Tschismar | H01M 10/613 |
| | | | 429/82 |
| 2017/0110770 A1 | 4/2017 | Marcicki et al. | |
| 2022/0158268 A1 | 5/2022 | Naruke et al. | |
| 2022/0250506 A1* | 8/2022 | Goldman-Shenhar | ................... |
| | | | G01C 21/3469 |

* cited by examiner

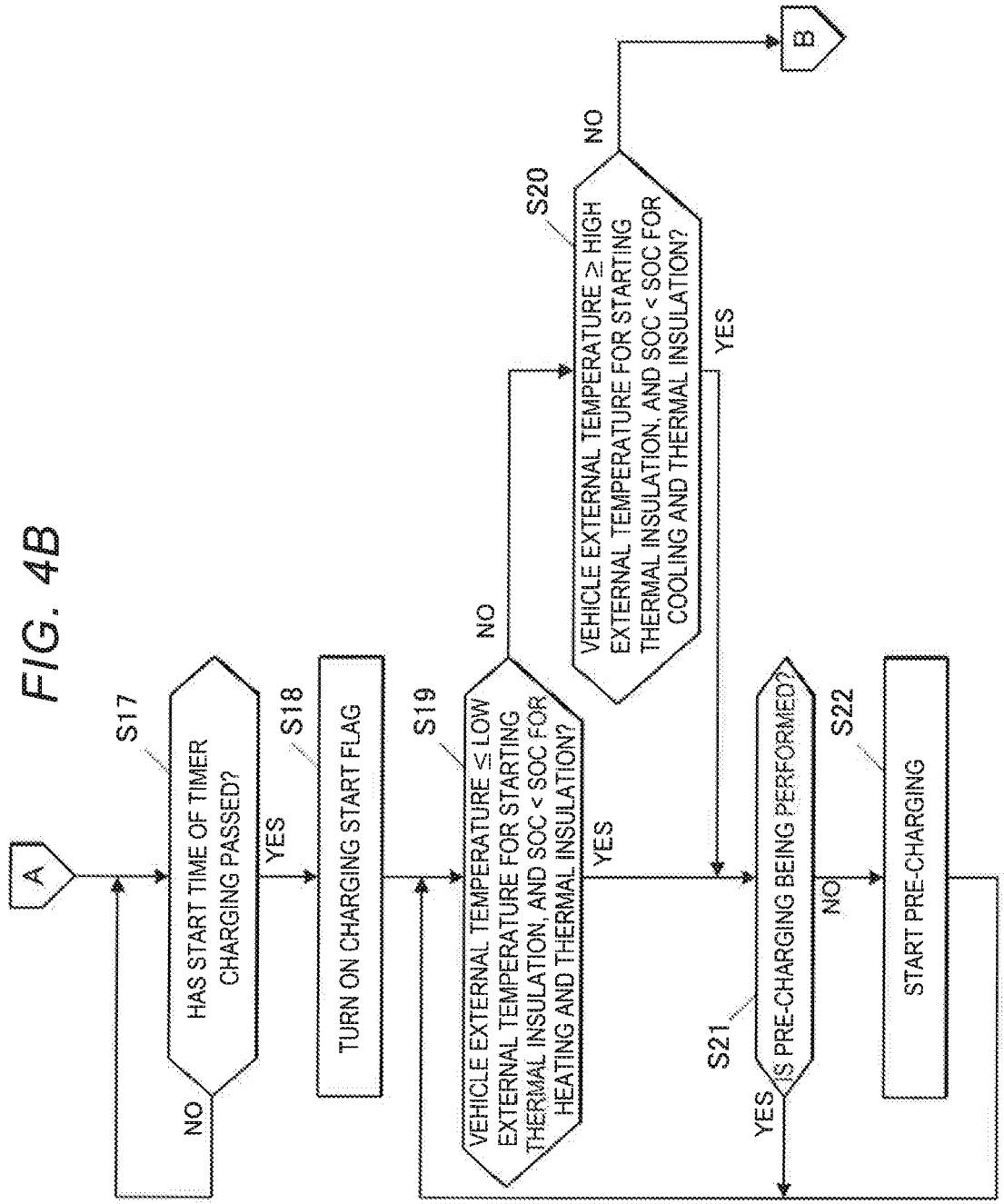

BATTERY PACK

CROSS-REFERENCE TO RELATED APPLICATIONS

The present application claims priority from Japanese Patent Application No. 2021-056967 filed on Mar. 30, 2021, the entire contents of which are hereby incorporated by reference.

BACKGROUND

The disclosure relates to a battery pack to be mounted on a vehicle.

Japanese Unexamined Patent Application Publication No. 2011-207321 discloses a technique for protecting a fuel cell by insulating it from surrounding heat. In this technique, a hollow heat insulating wall is provided around the fuel cell, and the degree of vacuum in the hollow part is varied when a vehicle system is terminated.

SUMMARY

An aspect of the disclosure provides a battery pack to be mounted on a vehicle. The battery pack includes a battery, a passage unit, a gas pump, a first valve, and an arithmetic and control unit. The passage unit is disposed on at least one of sides of the battery. The passage unit is configured to allow fluid to flow through an inside of the passage unit. The gas pump is configured to operate with electric power of the battery. The gas pump is configured to draw gas in the inside of the passage unit. The first valve is configured to shut off a fluid passage through which the gas is to be supplied to the inside of the passage unit. The arithmetic and control unit is configured to control the gas pump and the first valve. The arithmetic and control unit is configured to perform a first temperature regulating process. The first temperature regulating process includes driving the gas pump while the first valve is not shut off, and then drawing the gas from the inside of the passage unit by switching the first valve to a shut off state.

An aspect of the disclosure provides a battery pack to be mounted on a vehicle. The battery pack includes a battery, a passage unit, a gas pump, a first valve, and circuitry. The passage unit is disposed on at least one of sides of the battery. The passage unit is configured to allow fluid to flow through an inside of the passage unit. The gas pump is configured to operate with electric power of the battery. The gas pump is configured to draw gas in the inside of the passage unit. The first valve is configured to shut off a fluid passage through which the gas is to be supplied to the inside of the passage unit. The circuitry is configured to control the gas pump and the first valve. The circuitry is configured to perform a first temperature regulating process. The first temperature regulating process includes driving the gas pump while the first valve is not shut off, and then drawing the gas from the inside of the passage unit by switching the first valve to a shut off state.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 4B is a second part of the flowchart illustrating the operation of the battery pack according to the embodiment of the disclosure.

DETAILED DESCRIPTION

In a state in which the external temperature is low, and the temperature of a battery mounted on a vehicle is also low, the temperature of the battery remains low even if the surroundings of the battery is insulated.

It is desirable to provide a battery pack configured to be kept warm after a battery in a low temperature state is increased in temperature.

Figure 1:
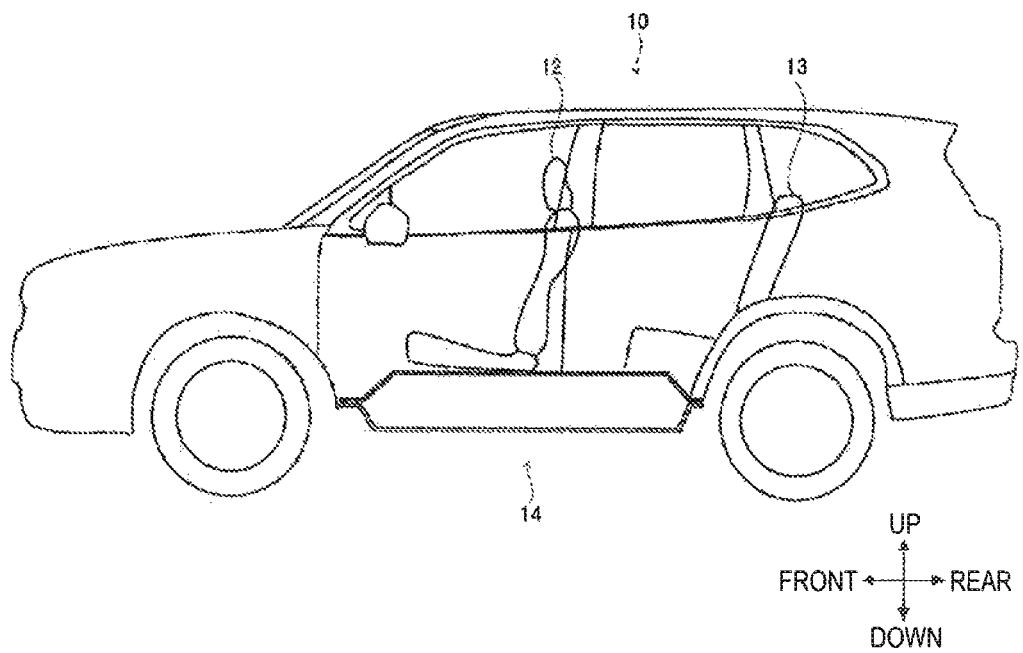
FIG. 1 is a side view illustrating a vehicle including a battery pack according to an embodiment of the disclosure.

Hereinafter, a battery pack 14 according to embodiments of the disclosure will be described in detail based on the drawings. The following description uses a front-rear direction, an upper-lower direction, and a right-left direction, where the right-left direction is a direction of a vehicle 10 as viewed from a rear side. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description FIG. 1 is a side view illustrating the vehicle 10 including the battery pack 14. The vehicle 10, which is an automobile, a train, or the like, is mounted with the battery pack 14 for supplying electric power to a motor and various electric components. The vehicle 10 is, for example, an electrical vehicle (EV), a hybrid electrical vehicle (HEV), or a plug-in hybrid electrical vehicle (PHEV).

The battery pack 14 is disposed under a front seat 12 and a rear seat 13. This enables effectively using an area under the front seat 12 and the rear seat 13. Moreover, in the state in which the battery pack 14 is disposed at a such position, a lower side of the battery pack 14 is placed on a bottom surface side of the vehicle 10. Thus, the battery pack 14 can be cooled by travel wind that is produced under the vehicle 10 during traveling.

Figure 2:
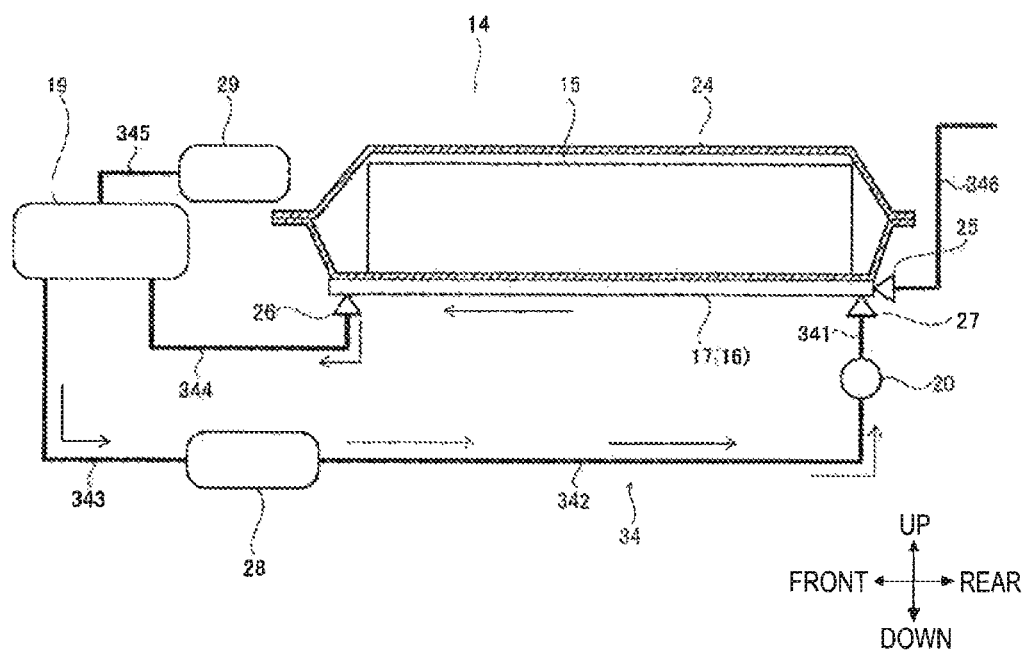
FIG. 2 is a schematic drawing view illustrating the battery pack according to the embodiment of the disclosure.

FIG. 2 is a schematic view illustrating a specific configuration of the battery pack 14.

The battery pack 14 mainly includes a battery module 15, a cooling unit 17, and a reservoir tank 19. The battery pack 14 also includes a fluid pump 20, a gas pump 29, a fluid passage 34, a first valve 25, a second valve 26, and a third valve 27. The fluid passage 34 includes fluid paths 341 to 346. In one example, the cooling unit 17 may serve as a "passage unit" of the disclosure. In one example, the battery module 15 may serve as a "battery" of the disclosure.

The battery module 15 supplies electric current to a motor that provides a driving force to the vehicle body of the vehicle 10. The battery module 15 can be a secondary battery, such as a nickel hydrogen battery or a lithium ion battery. Although not illustrated herein, the battery module 15 includes stacked battery cells. The battery module 15 is disposed in an area enclosed by a battery housing case 24. The battery housing case 24 is made of a metal plate or a synthetic resin plate.

The cooling unit 17 is disposed on at least one of sides (in one example, a lower side) of the battery module 15, in the vicinity of the battery module 15. A cooling fluid 16 for exchanging heat with the battery module 15 flows through the inside of the cooling unit 17. Liquid, such as water or antifreeze solution, or gas, can be used as the cooling fluid 16. A mixed fluid of liquid and gas may also be used as the cooling fluid 16. The cooling unit 17 is disposed between the battery module 15 and the outside of the vehicle 10. This enables cooling the cooling fluid 16 that flows through the inside of the cooling unit 17, by utilizing travel wind produced when the vehicle 10 travels. Moreover, this effect can be made remarkable by exposing the lower surface of the cooling unit 17 to the outside of the vehicle 10.

In this embodiment, in heat exchanging between the battery module 15 and the cooling fluid 16, many battery cells constituting the battery module 15 and the cooling fluid 16 exchange heat with each other. In addition, in regulating the temperature of the battery module 15, the temperatures of many battery cells constituting the battery module 15 are regulated. The battery module 15 and the battery cell are kinds of battery.

The cooling unit 17 also serves as a heat insulator, in the state in which the cooling fluid 16 is drained from the inside of the cooling unit 17 and the inside of the cooling unit 17 has a predetermined pressure reduced state. When a vehicle external temperature (which may also be referred to as a "temperature outside the vehicle") is higher than temperatures suitable for the use of the battery module 15, the battery module 15 is desirably thermally insulated from the outside of the vehicle 10 in order to avoid the battery module 15 from having high temperature due to the atmosphere outside the vehicle 10. Similarly, when the vehicle external temperature is lower than temperatures suitable for the use of the battery module 15, the battery module 15 is desirably thermally insulated from the outside of the vehicle 10 in order to avoid the battery module 15 from having low temperature due to the atmosphere outside the vehicle 10.

The cooling unit 17, which serves as a heat insulator, reduces the amount of heat exchange between the atmosphere outside the vehicle 10 and the battery module 15 and can keep the temperature of the battery module 15.

A chiller 28 cools the cooling fluid 16 that has increased in temperature due to heat exchange with the cooling unit 17. The chiller 28 may also be referred to as a "cooling water circulator".

The fluid pump 20 circulates the cooling fluid 16. In one example, the fluid pump 20 circulates the cooling fluid 16 through the cooling unit 17, the second valve 26, the fluid path 344, the reservoir tank 19, the fluid path 343, the chiller 28, the fluid path 342, the fluid pump 20, the fluid path 341, the third valve 27, and the cooling unit 17, in this order.

The reservoir tank 19 temporarily stores the cooling fluid 16 that is drained from the cooling unit 17.

The gas pump 29 transfers air to the cooling unit 17. The gas pump 29 is also used to heat the battery module 15. That is, the gas pump 29 idles when being driven in the state in which a pressure difference between an inlet and an outlet of gas is small. The idling means driving in the condition in which a load applied to the gas pump 29 is small. The idling of the gas pump 29 makes gas flow to the fluid path 345 coupled to the gas pump 29, and so on, and therefore, it does not greatly affect the vehicle 10. Thus, on the condition that the fluid passage 34 is in a state of allowing the gas pump 29 to idle, the gas pump 29 can be idled for a desired period. The idling causes the battery module 15 to discharge to the gas pump 29, whereby the battery module 15 generates Joule heat based on the internal resistance and increases in temperature. The gas pump 29 idles when being driven in the state in which the cooling fluid 16 is drained from the inside of the cooling unit 17 and the first valve 25 and the second valve 26 are open.

Units that constitute the battery pack 14 are coupled to one another via the fluid passage 34. The fluid path 341 couples the cooling unit 17 and the fluid pump 20, the fluid path 342 couples the fluid pump 20 and the chiller 28, and the fluid path 343 couples the chiller 28 and the reservoir tank 19. The fluid path 344 couples the reservoir tank 19 and the cooling unit 17, the fluid path 345 couples the reservoir tank 19 and the gas pump 29, and the fluid path 346 couples the cooling unit 17 to the outside. The fluid passage 34 is a pipe line made of metal or synthetic resin.

The fluid path 346 supplies gas (air) from the outside of the battery pack 14 to the inside of the cooling unit 17.

The fluid path 344 couples the gas pump 29 and the cooling unit 17 via the fluid path 345 and the reservoir tank 19.

The first valve 25 is mounted at a joint between the cooling unit 17 and the fluid path 346. The second valve 26 is mounted at a joint between the cooling unit 17 and the fluid path 344. The third valve 27 is mounted at a joint between the cooling unit 17 and the fluid path 341. Each of the first valve 25, the second valve 26, and the third valve 27 shuts off the flow of the fluid when closed and does not shut off the flow of the fluid when opened.

While the third valve 27 and the second valve 26 are open, upon being transferred by the fluid pump 20, the cooling fluid 16 circulates through the fluid path 341, the inside of the cooling unit 17, the fluid path 344, the reservoir tank 19, the fluid path 343, the chiller 28, and the fluid path 342, in this order. Due to this circulation of the cooling fluid 16, the cooling fluid 16 that is cooled by the chiller 28 exchanges heat with the battery module 15 and cools the battery module 15.

While the third valve 27 is close and the first valve and the second valve 26 are open, in response to transferring gas by the gas pump 29, the cooling fluid 16 in the inside of the cooling unit 17 is transferred to the reservoir tank 19, and air is sent to the inside of the cooling unit 17.

Moreover, while the third valve 27 and the first valve 25 are close and the second valve 26 is open, in response to transferring gas by the gas pump 29, air is drawn from the inside of the cooling unit 17, and the inside of the cooling unit 17 is reduced in pressure. Then, in the state in which the inside of the cooling unit 17 is reduced in pressure, the second valve 26 is closed, whereby the reduced pressure in the inside of the cooling unit 17 is kept, which makes the cooling unit 17 serves as a heat insulator. Due to the cooling unit 17 serving as a heat insulator, the temperature of the battery module 15 can be kept.

Herein, an end that is not coupled to the cooling unit 17 of the fluid path 346 is disposed higher than each constituent unit constituting the battery pack 14. This structure prevents the cooling fluid 16 from leaking from the fluid path 346 when the cooling unit 16 is transferred from the cooling unit 17 to the reservoir tank 19 in order to supply air to the inside of the cooling unit 17 and when the cooling fluid 16 is returned to the inside of the cooling unit 17.

Figure 3:
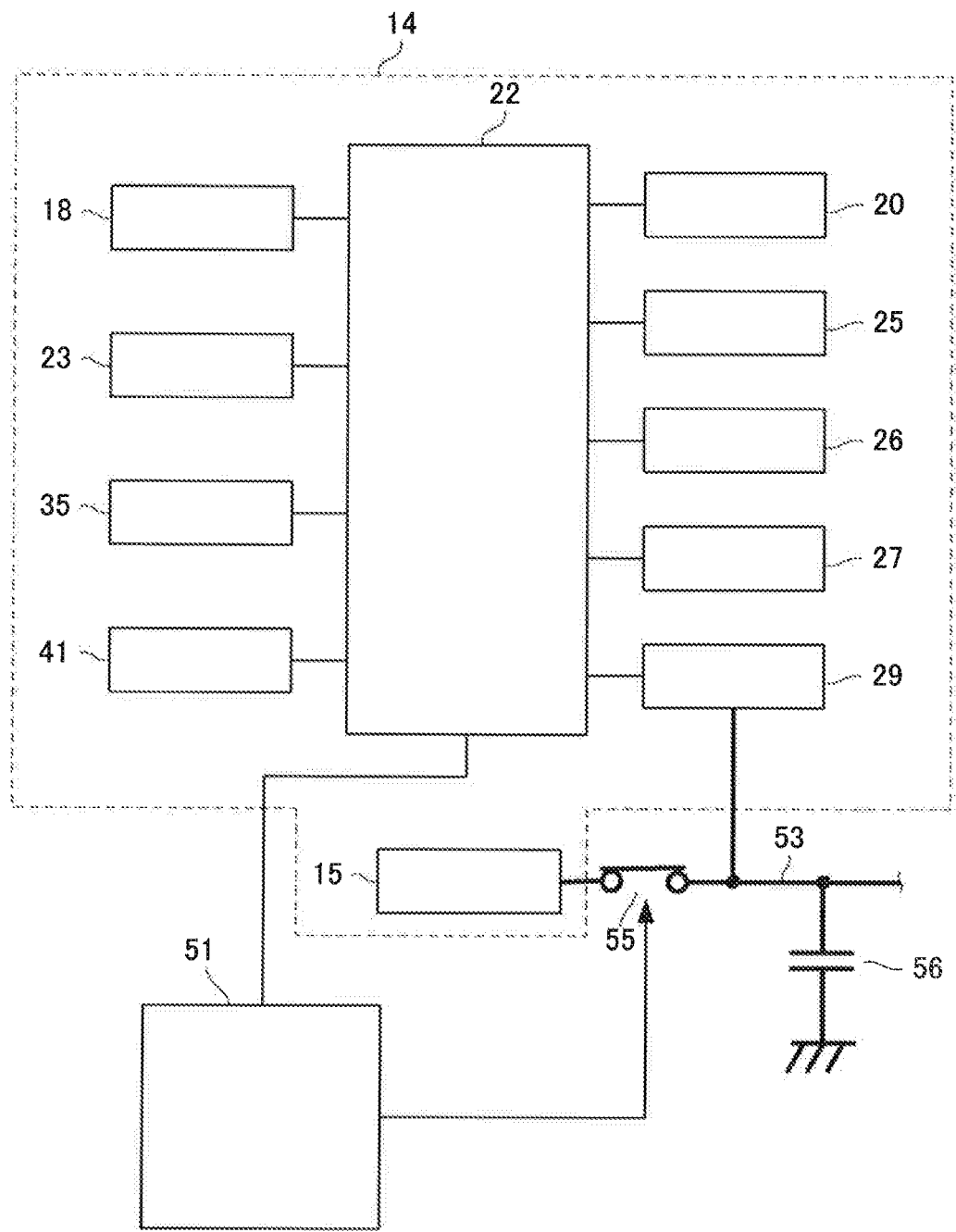
FIG. 3 is a block diagram illustrating a connection configuration of the battery pack according to the embodiment of the disclosure.

FIG. 3 is a block diagram illustrating a connection configuration of the battery pack 14. The battery pack 14 includes an arithmetic and control unit 22, a battery temperature measuring unit 18, a surrounding temperature measuring unit 23, an SOC managing unit 41, a storage 35, the fluid pump 20, the gas pump 29, the third valve 27, the second valve 26, and the first valve 25.

The battery temperature measuring unit 18 measures temperature of the battery module 15.

The surrounding temperature measuring unit 23 measures temperature of the outside of the battery pack 14, for example, the vehicle external temperature.

The SOC managing unit 41 monitors discharging current and charging current of the battery module 15 and calculates a state of charge (SOC) of the battery module 15.

The storage 35 is a random access memory (RAM) or a read only memory (ROM) and stores programs, parameters, etc. for operating the battery pack 14.

The arithmetic and control unit 22 is, for example, a central processing unit (CPU), and has input terminals that are coupled to the battery temperature measuring unit 18, the surrounding temperature measuring unit 23, the SOC managing unit 41, and the storage 35. Output terminals of the arithmetic and control unit 22 are coupled to the fluid pump 20, the gas pump 29, the third valve 27, the second valve 26, and the first valve 25. The arithmetic and control unit 22 controls operation of the fluid pump 20 and the gas pump 29 and open and closed states of the first valve 25 to the third valve 27, based on input information input from the battery temperature measuring unit 18, the surrounding temperature measuring unit 23, the SOC managing unit 41, and the storage 35. Note that operation of the arithmetic and control unit 22 is not limited to obtaining external temperature information from a measurement signal of the surrounding temperature measuring unit 23, but may include receiving external temperature information from another ECU equipped on the vehicle 10, by communication or the like.

The arithmetic and control unit 22 is also coupled to a control unit 51 of the vehicle 10 via a communication line and is communicable with the control unit 51.

In response to a user setting timer charging, the control unit 51 of the vehicle 10 stores setting data of the timer charging. The setting data contains a start time, a finish time, an SOC for finishing charging, of the timer charging. In a case in which a user schedules timer charging, the setting data is input to the control unit 51, and the vehicle 10 is made to be able to receive electric power from the outside, such as by inserting a charging plug in a connector of the vehicle 10. The control unit 51 starts charging the battery module 15 by operating an in-vehicle charger when the start time comes. Thereafter, when the finish time comes, or the SOC of the battery module 15 reaches the SOC for finishing charging, the control unit 51 stops the in-vehicle charger to terminate charging the battery module 15.

The gas pump 29 is driven by electric power supplied from the battery module 15 via a power line 53 of the vehicle 10.

A relay 55 is coupled between the power line 53 of the vehicle 10 and the battery module 15. When the system of the vehicle 10 is terminated, the relay 55 is turned off (disconnected), whereby the power line 53 of the vehicle 10 and the battery module 15 are disconnected. Terminating of the system of the vehicle 10 means that each unit for driving the vehicle 10, including the control unit 51, shifts to a dormant state. The power line 53 of the vehicle 10 is coupled to a capacitor 56, and therefore, after the relay 55 is turned off, high voltage remains in the power line 53 until an electric charge accumulated in the capacitor 56 is released. It is desirable to quickly remove the high voltage that remains in the power line 53 when the system of the vehicle 10 is terminated. The capacitor 56 may be an input capacitor of an electrical device coupled to the power line 53.

When the system of the vehicle 10 is terminated, the arithmetic and control unit 22 starts or keeps driving the gas pump 29 to quickly remove the high voltage remaining in the power line 53.

Next, control processing that is executed by the arithmetic and control unit 22 in response to operation for terminating the system of the vehicle 10, will be described. FIGS. 4A to 4D are flowcharts illustrating the control processing. The operation for terminating the system of the vehicle 10 is, for example, operation for turning off the ignition or operation for turning off the power supply of the vehicle 10, which is performed by a user of the vehicle 10. In response to operation for terminating the system, the arithmetic and control unit 22 starts the control processing from step S11.

While the control processing is performed, the arithmetic and control unit 22 inputs temperature information of the battery module 15 from the battery temperature measuring unit 18, vehicle external temperature information from the surrounding temperature measuring unit 23, and SOC information of the battery module 15 from the SOC managing unit 41. In addition, the arithmetic and control unit 22 internally calculates a current time or inputs information of a current time from the outside.

In step S11, the arithmetic and control unit 22 reads, from the storage 35, setting data of "low external temperature for starting thermal insulation", "high external temperature for starting thermal insulation", "heating starting temperature", and "cooling starting temperature", which are stored in the storage 35 in advance. The "low external temperature for starting thermal insulation" represents an upper end value (for example, 0° C.) of the vehicle external temperature, at which the battery module 15 is started to be thermally insulated from the atmosphere outside the vehicle 10 due to low vehicle external temperature. The "high external temperature for starting thermal insulation" represents a lower end value (for example, 45° C.) of the vehicle external temperature, at which the battery module 15 is started to be thermally insulated from the atmosphere outside the vehicle 10 due to high vehicle external temperature. The "heating starting temperature" represents an upper end value (for example, 0° C.) of the temperature of the battery module 15, at which the battery module 15 is started to be heated. The "cooling starting temperature" represents a lower end value (for example, 45° C.) of the temperature of the battery module 15, at which the battery module 15 is started to be cooled. The battery module 15 has a temperature range that is suitable for use, and limitation to charging and discharging current increases as the temperature is out of this temperature range. The low external temperature for starting thermal insulation, the high external temperature for starting thermal insulation, the heating starting temperature, and the cooling starting temperature are set based on this suitable temperature range, in advance.

In step S12, the arithmetic and control unit 22 acquires data relating to the timer charging from the control unit 51 of the vehicle 10. The acquired data contains information showing existence of setting of the timer charging, and "start time", "finish time", and "SOC for finishing charging", which are contained in the setting data of the timer charging. Moreover, in step S12, the arithmetic and control unit 22 initializes a "charging start flag" that shows whether the timer charging is being performed. The following description assumes that, when the charging start flag is on, the timer charging is being performed, and when it is off, the timer charging is not being performed. The initialization makes the charging start flag off.

In step S13, the arithmetic and control unit 22 reads setting data of a "system termination voltage" from the storage 35. The "system termination voltage" shows an upper limit of a voltage value of the power line 53, which is desired when the system of the vehicle 10 is terminated. That is, the system termination voltage corresponds to the voltage after the relay 55 is turned off and high voltage remaining in the power line 53 is removed.

In step S14, the arithmetic and control unit 22 turns off the gas pump 29 as an initializing process.

In step S15, the arithmetic and control unit 22 calculates an "SOC for heating and thermal insulation" and an "SOC for cooling and thermal insulation" of the battery module 15 by using first map data and second map data.

The "SOC for heating and thermal insulation" shows an SOC of the battery module 15 that is estimated to be consumed in a heating process and a thermal insulation process performed to increase the temperature of the battery module 15 to be higher than the heating starting temperature (for example, 0° C.). The SOC for heating and thermal insulation includes an SOC corresponding to the amount of electric power that is used to idle the gas pump 29 in order to heat the battery module 15. In addition, the SOC for heating and thermal insulation includes an SOC corresponding to the amount of electric power that is used to drive the gas pump 29 in order to make the cooling unit 17 serve as a heat insulator. The SOC for heating and thermal insulation varies depending on a difference between the temperature of the battery module 15 and the heating starting temperature (for example, 0° C.). The first map data shows a relationship of the SOC for heating and thermal insulation relative to the difference between the temperature of the battery module 15 and the heating starting temperature (for example, 0° C.). The first map data is prepared in advance by experiments, simulations, or the like, and is stored in the storage 35.

The "SOC for cooling and thermal insulation" shows an SOC of the battery module 15 that is estimated to be consumed in a cooling process and a thermal insulation process performed to decrease the temperature of the battery module 15 to be lower than the cooling starting temperature (for example, 45° C.). The SOC for cooling and thermal insulation includes an SOC corresponding to electric power that is used to operate the chiller 28 and so on in order to cool the battery module 15. The SOC for cooling and thermal insulation also includes an SOC corresponding to the amount of electric power that is used to drive the gas pump 29 in order to make the cooling unit 17 serve as a heat insulator. The SOC for cooling and thermal insulation varies depending on a difference between the temperature of the battery module 15 and the cooling starting temperature (for example, 45° C.). The second map data shows a relationship of the SOC for cooling and thermal insulation relative to the difference between the temperature of the battery module 15 and the cooling starting temperature (for example, 45° C.). The second map data is prepared in advance by experiments, simulations, or the like, and is stored in the storage 35.

In step S16, the arithmetic and control unit 22 determines whether the timer charging is set, and the arithmetic and control unit 22 moves the processing to step S17 if the timer charging is set, but moves to the processing to step S23 if the timer charging is not set.

In step S17, the arithmetic and control unit 22 determines whether the current time has passed the "start time" of the timer charging, and the arithmetic and control unit 22 repeats step S17 if the determination result is NO, but advances the processing to step S18 if the determination result is YES.

In step S18, the arithmetic and control unit 22 sets the "charging start flag" to ON. The value of ON indicates that the timer charging has started.

In step S19, the arithmetic and control unit 22 determines whether the vehicle external temperature is at or lower than the "low external temperature for starting thermal insulation (for example, 0° C.)" and the SOC of the battery module 15 is less than the "SOC for heating and thermal insulation". As a result, the arithmetic and control unit 22 moves the processing to step S21 if the determination result is YES, but moves the processing to step S20 if the determination result is NO.

In step S20, the arithmetic and control unit 22 determines whether the vehicle external temperature is at or higher than the "high external temperature for starting thermal insulation (for example, 45° C.)" and the SOC of the battery module 15 is less than the "SOC for cooling and thermal insulation". As a result, the arithmetic and control unit 22 moves the processing to step S21 if the determination result is YES, but moves the processing to step S23 if the determination result is NO.

In step S21, the arithmetic and control unit 22 determines whether pre-charging is being performed. The pre-charging will be described later. The arithmetic and control unit 22 returns the processing to step S19 if the determination result is YES, but advances the processing to step S22 if the determination result is NO.

In step S22, the arithmetic and control unit 22 starts pre-charging so as to increase the SOC of the battery module 15 to be at or higher than the "SOC for heating and thermal insulation" or the "SOC for cooling and thermal insulation". The temperature of the battery module 15 is outside the range appropriate for charging, and thus, the charging current of pre-charging is smaller than charging current during normal charging in the timer charging. However, the charging current of pre-charging is not limited to this and may be the same as or similar to the charging current during normal charging in the timer charging. The arithmetic and control unit 22 returns the processing to step S19 after starting the pre-charging.

The pre-charging of the battery module 15 is performed by loop processing of steps S19 to S21, in the case in which the SOC of the battery module 15 is not enough to thermally insulate between the battery module 15 and the atmosphere outside the vehicle 10. This pre-charging ensures the SOC that allows heating or cooling the battery module 15, which is performed depending on the temperature of the battery module 15, and also allows the cooling unit 17 to serve as a heat insulator. Then, the processing moves to step S23.

Step S23 follows step S16 (in the case in which the timer charging is not set) or step S20 (in the case in which the timer charging is set). In step S23, the arithmetic and control unit 22 determines whether the vehicle external temperature is at or lower than the low external temperature for starting thermal insulation (for example, 0° C.) or at or higher than the high external temperature for starting thermal insulation (for example, 45° C.). The arithmetic and control unit 22 moves the processing to step S26 if the determination result is YES, but moves the processing to step S24 if the determination result is NO.

In step S24, the arithmetic and control unit 22 opens the third valve 27, the second valve 26, and the first valve 25.

In step S25, the arithmetic and control unit 22 turns on the gas pump 29. In response to turning on the gas pump 29 while the first valve 25 is open, air flows to the gas pump 29 by a small load, and the gas pump 29 idles. After performing step S25, the arithmetic and control unit 22 moves the processing to step S34.

On the other hand, after the processing moves from step S23 to step S26, the arithmetic and control unit 22 determines whether the temperature of the battery module 15 is at or higher than the "cooling starting temperature (for example, 45° C.)" in step S26. As a result, if the determination result is YES, the arithmetic and control unit 22 repeats the process in step S26, but if it is NO, the arithmetic and control unit 22 advances the processing to step S27. In the case in which the temperature of the battery module 15 is lower than the "cooling starting temperature (for example, 45° C.)", the processing advances to step S27, instead of repeating the process in step S26. In contrast, the temperature of the battery module 15 is at or higher than the "cooling starting temperature (for example, 45° C.)", the process in step S26 is repeated, and in the meanwhile, the cooling fluid 16 circulates through the cooling unit 17 to cool the battery module 15 to a temperature lower than the cooling starting temperature (for example, 45° C.).

In step S27, the arithmetic and control unit 22 switches the third valve 27 from an open to closed state and keeps the second valve 26 and the first valve 25 open. Closing the third valve 27 stops circulation of the cooling fluid 16 through the cooling unit 17.

In step S28, the arithmetic and control unit 22 turns on the gas pump 29. In response to turning on the gas pump 29, the cooling fluid 16 of the cooling unit 17 is gradually sent to the reservoir tank 19 and is gradually replaced by gas. After the cooling fluid 16 is drained from the cooling unit 17, air flows in the gas pump 29 by a small load, and the gas pump 29 thus idles.

In step S29, the arithmetic and control unit 22 determines whether the cooling fluid 16 is drained from the inside of the cooling unit 17. The arithmetic and control unit 22 repeats the process in step S29 if the determination result is NO, but advances the processing to step S30 if the determination result is YES. The determination in step S29 can be performed based on the amount of the cooling fluid 16 flowing into the reservoir tank 19. Alternatively or additionally, the determination in step S29 may also be performed based on the driving time of the gas pump 29.

In step S30, the arithmetic and control unit 22 determines whether the temperature of the battery module 15 is at or lower than the "heating starting temperature (for example, 0° C.)". The arithmetic and control unit 22 repeats the process in step S30 if the determination result is YES, but advances the processing to step S31 if the determination result is NO. In the case in which the temperature of the battery module 15 is higher than the "heating starting temperature (for example, 0° C.)", the processing advances to step S31, instead of repeating the process in step S30. In contrast, in the case in which the temperature of the battery module 15 is at or lower than the "heating starting temperature (for example, 0° C.)", the process in step S30 is repeated. The gas pump 29 is already turned on in step S28, and therefore, the gas pump 29 idles while the process in step S30 is repeated. The idling discharges the battery module 15 to the gas pump 29, whereby the battery module 15 generates Joule heat based on the internal resistance and increases in temperature. Thereafter, the temperature of the battery module 15 exceeds the heating starting temperature (for example, 0° C.).

In step S31, the arithmetic and control unit 22 switches the first valve 25 from an open to closed state, and it keeps the third valve 27 close and keeps the second valve 26 open. Closing the first valve 25 enables the gas pump 29 to draw gas from the cooling unit 17.

In step S32, the arithmetic and control unit 22 determines whether the inside of the cooling unit 17 is in a predetermined pressure reduced state. The arithmetic and control unit 22 repeats the process in step S32 if the determination result is NO, but advances the processing to step S33 if the determination result is YES. The predetermined pressure reduced state means an approximately vacuum state or a pressure reduced state in which a heat insulating effect is provided. While the process in step S32 is repeated, the gas pump 29 draws gas from the inside of the cooling unit 17, and thus, the inside of the cooling unit 17 has a predetermined pressure reduced state. The determination in step S32 can be performed based on measurement result of a barometer provided to the inside of the cooling unit 17. Alternatively or additionally, the determination in step S32 may also be performed based on an elapsed time after the first valve 25 is closed.

In one example, the processes in steps S27 to S33 in the state in which the temperature of the battery module 15 is at or lower than the "heating starting temperature (for example, 0° C.)", may correspond to a first temperature regulating process of the disclosure. In one example, the processes in steps S26 to S33 in the state in which the temperature of the battery module 15 is at or higher than the "cooling starting temperature (for example, 45° C.)", may correspond to a second temperature regulating process of the disclosure.

In step S33, the arithmetic and control unit 22 switches the second valve 26 from an open to closed state while keeping the first valve 25 and the third valve 27 close. This switching keeps the pressure reduced state of the inside of the cooling unit 17 even when the gas pump 29 stops.

In step S34, the arithmetic and control unit 22 determines whether the charging start flag is on. The arithmetic and control unit 22 moves the processing to step S35 if the charging start flag is turned on, but advances the processing to step S39 if the charging start flag is off. In the case in which the timer charging is set, at the stage when the processing advances to step S34, the start time of the time charging has already passed, and the charging start flag is turned on in step S18. In the case in which the timer charging is not set, the charging start flag is off.

In step S35, the arithmetic and control unit 22 turns off the gas pump 29.

In step S36, the arithmetic and control unit 22 determines whether the finish time of the timer charging has come. In one example, the arithmetic and control unit 22 determines whether the SOC of the battery module 15 is at or greater than the SOC for finishing charging, and whether the current time has passed the finish time of the timer charging. As a result, if the both determination results are NO, the arithmetic and control unit 22 repeats the process in step S36. On the other hand, if at least one of the determination results is YES, the arithmetic and control unit 22 advances the processing to step S37.

In step S37, the arithmetic and control unit 22 turns off the charging start flag and deletes information showing existence of setting of the timer charging, which is acquired in step S12 and is stored in storage 35.

In step S38, the arithmetic and control unit 22 turns on the gas pump 29. The arithmetic and control unit 22 moves the processing to step S39 after turning on the gas pump 29.

Step S39 follows step S34 or step S38 depending on cases. In each case, the gas pump 29 is being driven. In step S39, the arithmetic and control unit 22 sends information for permitting turning off (disconnection of) the relay 55, to the control unit 51 of the vehicle 10. In response to turning off the relay 55, the power line 53 and the battery module 15 are disconnected, and the power supply to the gas pump 29 is shut off.

In step S40, the arithmetic and control unit 22 determines whether the voltage remaining in the power line 53 due to the capacitor 56 becomes equal to or lower than the system termination voltage. The voltage that remains in the power line 53 can be determined based on measurement result of a voltmeter provided to the power line 53. If the determination result is NO, the arithmetic and control unit 22 repeats the process in step S40, but if it is YES, the arithmetic and control unit 22 advances the processing to step S41. While the process in step S40 is repeated, the voltage remaining in the power line 53 is reduced as current is sent from the power line 53 to the gas pump 29 that is being driven.

In step S41, the arithmetic and control unit 22 turns off the gas pump 29.

In step S42, the arithmetic and control unit 22 shuts down itself.

Then, the arithmetic and control unit 22 finishes the control processing.

Next, the following describes how the battery pack 14 operates by the control processing in several situations with different conditions, such as temperature of the battery module 15, vehicle external temperature, and use of the timer charging. In the description, the step number of the control processing corresponding to the operation is mentioned together.

First, a first situation is described. In this situation, the vehicle external temperature is higher than the "low external temperature for starting thermal insulation (for example, 0° C.)" but is lower than the "high external temperature for starting thermal insulation (for example, 45° C.)", in other words, the battery module 15 and the atmosphere outside the vehicle 10 are not thermally insulated.

In the case in which the timer charging is not set in the first situation, after a passenger operates to terminate the system, the determination is immediately performed (NO in S16 and NO in S23), and the gas pump 29 is turned on while the third valve 27, the second valve 26, and the first valve 25 are open (S24 and S25). Thereafter, the relay 55 of the vehicle 10 is turned off, and the voltage of the power line 53 is reduced from high voltage to the system termination voltage by electric power consumption of the gas pump 29. After the voltage is reduced, the gas pump 29 is turned off, and the arithmetic and control unit 22 shuts down (NO in S34 and S39 to S42). The process of reducing the voltage of the power line 53 and the process of terminating the operation of the battery pack 14 are collectively called a "process of reducing voltage and shutting down", hereinafter.

In the case in which the timer charging is set in the first situation, operation of the battery pack 14 starts when the start time of the timer charging has passed (YES in S16 and YES in S17). Then, while the third valve 27, the second valve 26, and the first valve 25 are kept open, the gas pump 29 is turned on once and is then turned off (S18 to S20, NO in S23, S24, S25, S34, and S35). Note that the operation to turn on once and then turn off the gas pump 29 may be omitted. Thereafter, the timer charging starts, and after the timer charging is completed (YES in S36), the gas pump 29 is turned on (S38), and the process of reducing voltage and shutting down is performed (S39 to S42).

Next, a second situation will be described. In this situation, the vehicle external temperature is at or higher than the "high external temperature for starting thermal insulation (for example, 45° C.)", and the temperature of the battery module 15 is at or higher than the "cooling starting temperature (for example, 45° C.)".

In the case in which the timer charging is not set in the second situation, after a passenger operates to terminate the system, the cooling fluid 16 is made to flow to the cooling unit 17 to cool the battery module 15 to be lower than the cooling starting temperature (for example, 45° C.) (NO in S16, S23, and S26). Then, after the third valve 27 is closed, and the gas pump 29 is turned on, the first valve 25 and the second valve 26 are switched to a closed state at appropriate timing. Thus, the cooling fluid 16 is drained and air is drawn from the cooling unit 17, whereby the inside of the cooling unit 17 is kept at a predetermined pressure reduced state (S27 to S33). That is, the cooling unit 17 serves as a heat insulator. The process of cooling the battery module 15 and the process of making the cooling unit 17 serve as a heat insulator are collectively called a "process of cooling and heat insulating", hereinafter. The process of cooling and heat insulating keeps the battery module 15 at temperatures suitable for use, whereby the electric power of the battery module 15 can be used quickly after the vehicle 10 is activated next time.

After the process of cooling and heat insulating, the gas pump 29 is still turned on. Thus, subsequently, the process of reducing voltage and shutting down is performed to terminate the operation of the battery pack 14.

In the case in which the timer charging is set in the second situation, the operation of the battery pack 14 starts when the start time of the timer charging has passed (YES in S16 and YES in S17), and then, the process of cooling and heat insulating is performed (YES in S23 and S26 to S33). In the meanwhile, it is determined whether the SOC of the battery module 15 is lower than the SOC to enable the process of cooling and heat insulating, prior to this process. If the SOC of the battery module 15 is low, the SOC is increased by pre-charging (S19 to S22) before the process of cooling and heat insulating is performed.

Thereafter, the gas pump 29 is turned off once, and the timer charging is performed (YES in S34 and S35 to S37).

Subsequently, the gas pump 29 is turned on again (S38), and the process of reducing voltage and shutting down is performed (S39 to S42).

In the case in which the SOC of the battery module 15 is low, the pre-charging ensures the SOC that allows the process of cooling and heat insulating, before full-scale timer charging starts. Thus, the full-scale timer charging is performed in the state in which the process of cooling and heat insulating has been conducted and the temperature of the battery module 15 is kept at temperatures suitable for charging. Moreover, the process of cooling and heat insulating keeps the battery module 15 at temperatures suitable for use, whereby the electric power charged in the battery module 15 can be used quickly after the vehicle 10 is activated next time.

Next, a third situation will be described. In this situation, the vehicle external temperature is at or lower than the "low external temperature for starting thermal insulation (for example, 0° C.)", and the temperature of the battery module 15 is at or lower than the "heating starting temperature (for example, 0° C.)".

In the case in which the timer charging is not set in the third situation, after a passenger operates to terminate the system, the third valve 27 is switched to a closed state to immediately stop circulation of the cooling fluid 16 (S16, S23, S26, and S27). Then, the gas pump 29 is turned on to drain the cooling fluid 16 from the cooling unit 17, and the gas pump 29 then idles (S28 to S30). The idling of the gas pump 29 heats the battery module 15 until the battery module 15 has a temperature higher than the heating starting temperature (for example, 0° C.) (NO in S30). Subsequently, the first valve 25 and the second valve 26 are switched to a closed state at appropriate timing, whereby air is drawn from the cooling unit 17, and the inside of the cooling unit 17 is kept at a predetermined pressure reduced state (S31 to S33). That is, the cooling unit 17 serves as a heat insulator. The process of heating the battery module 15 and the process of making the cooling unit 17 serve as a heat insulator are collectively called a "process of heating and heat insulating", hereinafter. The process of heating and heat insulating keeps the battery module 15 at temperatures suitable for use, whereby the electric power of the battery module 15 can be used quickly after the vehicle 10 is activated next time.

After the process of heating and heat insulating, the gas pump 29 is still turning on. Thus, subsequently, the process of reducing voltage and shutting down is performed to terminate the operation of the battery pack 14.

In the case in which the timer charging is set in the third situation, the operation of the battery pack 14 starts when the start time of the timer charging has passed (YES in S16 and YES in S17), and then, the process of heating and heat insulating is performed (YES in S23 and S26 to S33). In the meanwhile, it is determined whether the SOC of the battery module 15 is lower than the SOC to enable the process of heating and heat insulating, prior to this process. If the SOC of the battery module 15 is low, the SOC is increased by pre-charging (S19 to S22) before the process of heating and heat insulating is performed.

Thereafter, the gas pump 29 is turned off once, and the timer charging is performed (YES in S34 and S35 to S37). Subsequently, the gas pump 29 is turned on again (S38), and the process of reducing voltage and shutting down is performed (S39 to S42).

In the case in which the SOC of the battery module 15 is low, the pre-charging ensures the SOC that allows the process of heating and heat insulating, before full-scale timer charging starts. Thus, the full-scale timer charging is performed in the state in which the process of heating and heat insulating has been conducted and the temperature of the battery module 15 is kept at temperatures suitable for charging. Moreover, the process of heating and heat insulating keeps the battery module 15 at temperatures suitable for use, whereby the electric power charged in the battery module 15 can be used quickly after the vehicle 10 is activated next time.

The above describes about operation of the battery pack 14.

This embodiment provides the following main effects.

The battery pack 14 of this embodiment includes the gas pump 29 that operates with the electric power of the battery module 15. The arithmetic and control unit 22 drives the gas pump 29 while the first valve 25 is open (not shut off) and then switches the first valve 25 to a closed (shut off) state, whereby it can execute the process of drawing gas from the inside of the cooling unit 17 (steps S28 to S32 in FIG. 4C). Driving the gas pump 29 while the first valve 25 is open (not shut off) makes the gas pump 29 idle. This allows the battery module 15 to discharge electricity to the gas pump 29 and to increase in temperature. Thereafter, the first valve 25 is switched to a closed (shut off) state, whereby the inside of the cooling unit 17 is reduced in pressure, and the cooling unit 17 serves as a heat insulator. Thus, the battery module 15 at a low temperature is heated before being kept warm. Moreover, the gas pump 29 that imparts heat-insulating properties to the cooling unit 17 is also used to heat the battery module 15. The multiple serves of the gas pump 29 enable the battery pack 14 to have a more compact configuration and also enable reducing cost of components.

In the battery pack 14 of this embodiment, the arithmetic and control unit 22 switches the second valve 26 to a closed (shut off) state after reducing pressure in the inside of the cooling unit 17. This switching enables keeping the heat-insulating effect of the cooling unit 17 even when the gas pump 29 is stopped later. Thus, the temperature variation of the battery module 15 can be made small without consuming electric power, such as in a case where the vehicle 10 is parked for a long time.

Figure 4A:
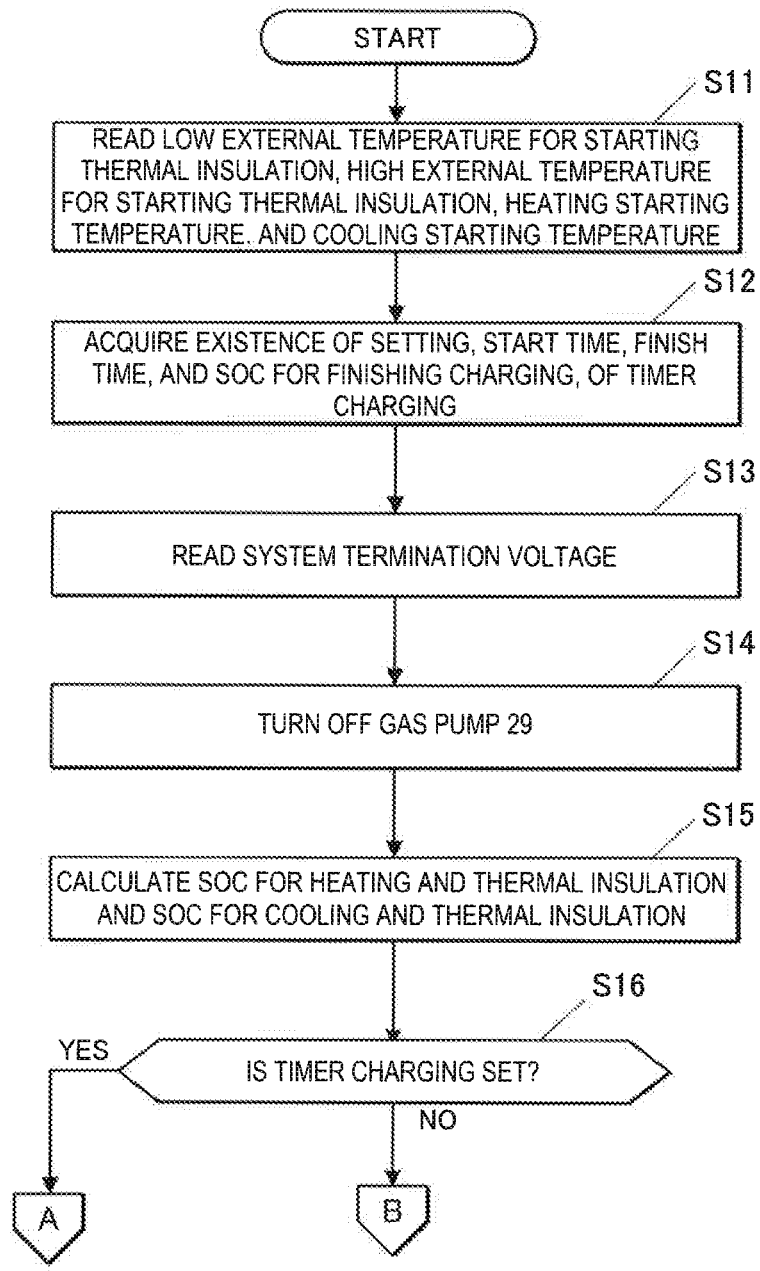
FIG. 4A is a first part of a flowchart illustrating operation of the battery pack according to the embodiment of the disclosure.
Figure 4C:
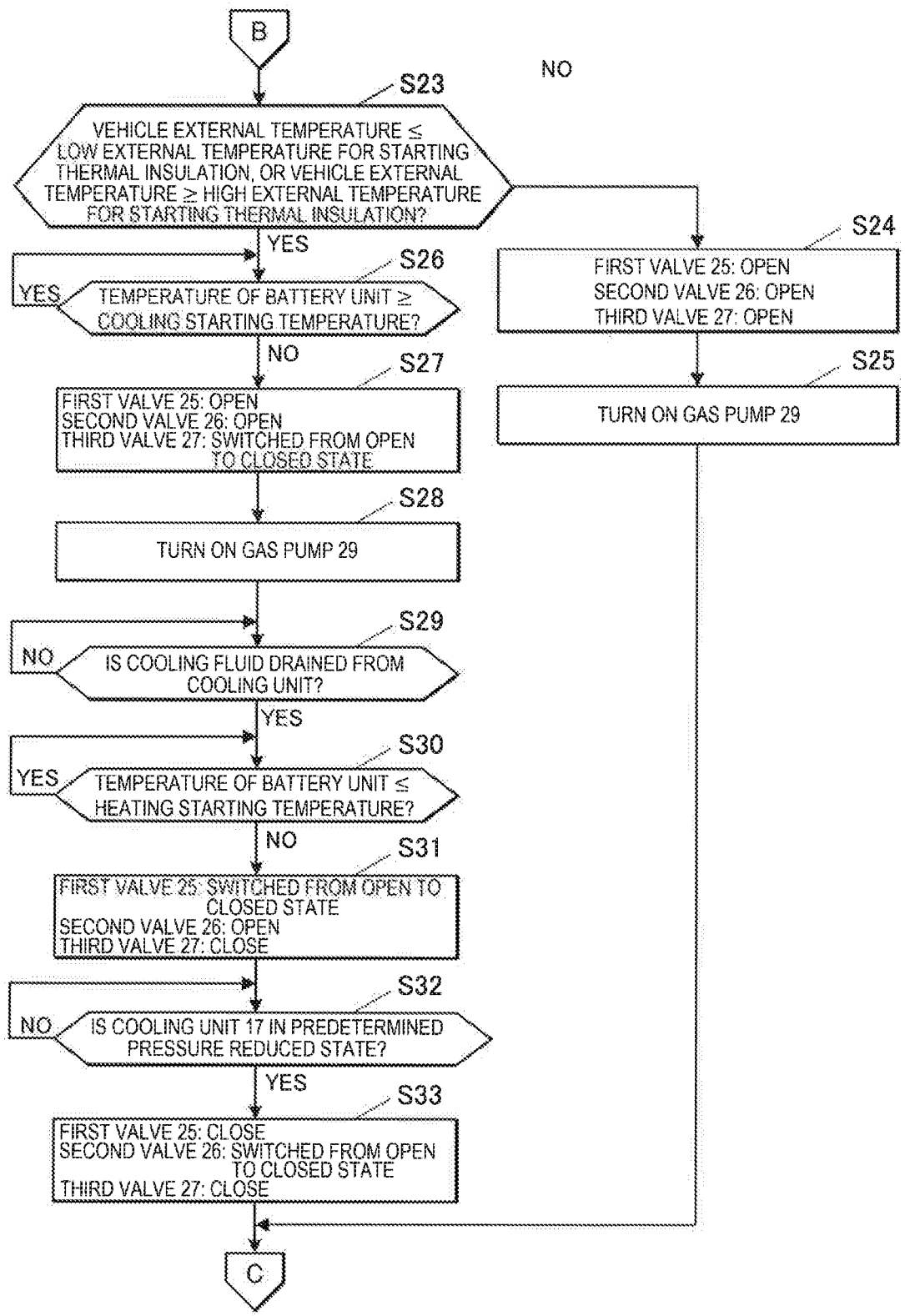
FIG. 4C is a third part of the flowchart illustrating the operation of the battery pack according to the embodiment of the disclosure.
Figure 4D:
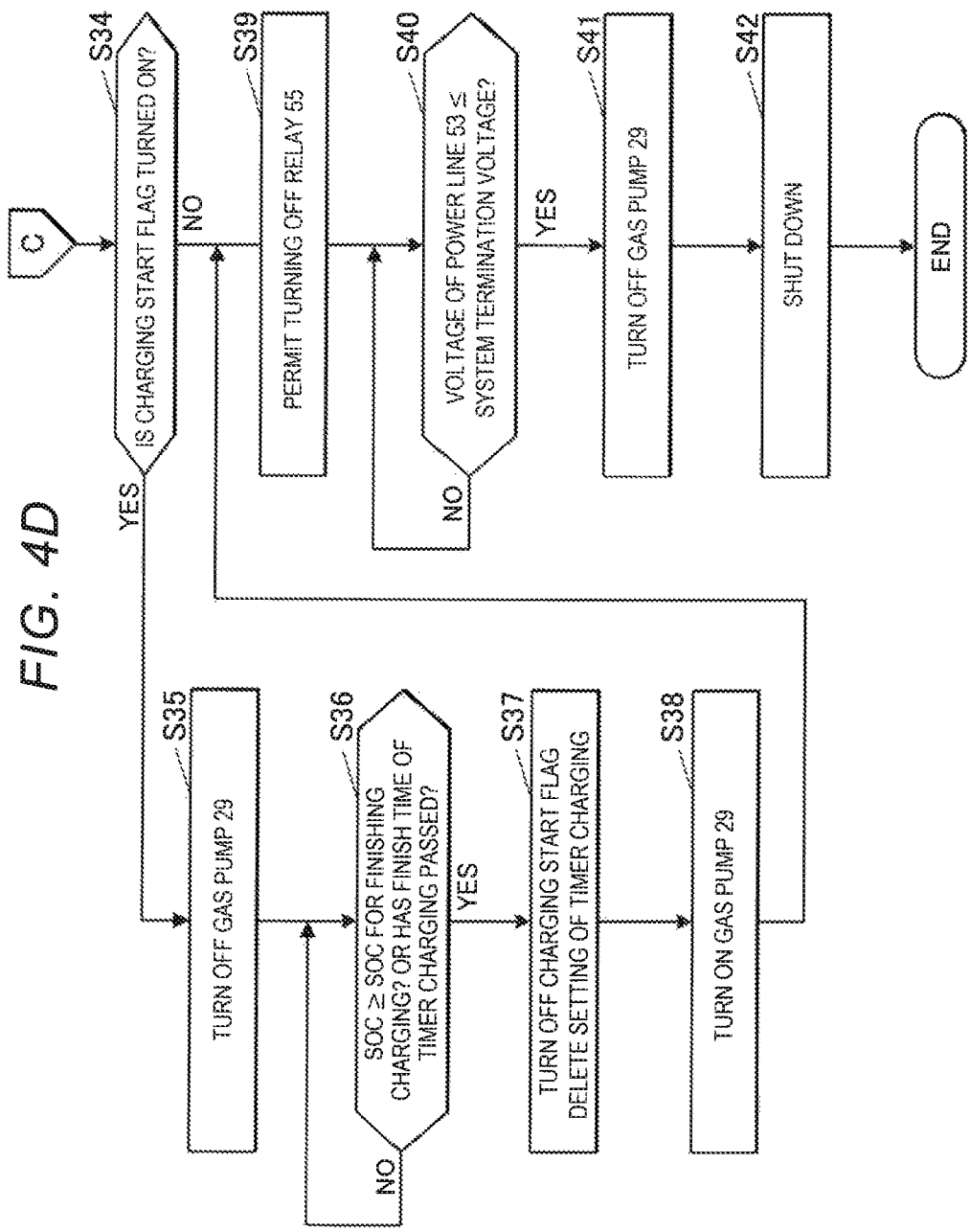
FIG. 4D is a fourth part of the flowchart illustrating the operation of the battery pack according to the embodiment of the disclosure.

In the battery pack 14 of this embodiment, when the relay 55 is turned off in order to terminate the system of the vehicle 10 in the state in which the gas pump 29 is coupled to the power line 53 of the vehicle 10, the arithmetic and control unit 22 starts or keeps driving the gas pump 29 (steps S34 to S40 in FIG. 4D). This process quickly reduces high voltage that remains in the power line 53, to low voltage when the relay 55 is turned off. Moreover, compared with a case of separately providing components for reducing the voltage of the power line 53 (for example, a resistor and a control circuit that couples the resistor to the power line 53), such components can be omitted, resulting in reduction in cost of components of the vehicle 10.

In the battery pack 14 of this embodiment, when the timer charging is performed under low temperature, the arithmetic and control unit 22 performs pre-charging to make the battery module 15 ensure electric power for driving the gas pump 29 (steps S19 to S22 in FIG. 4B). After the electric power is ensured, the arithmetic and control unit 22 drives the gas pump 29 to perform the process of heating the battery module 15 and reducing the pressure in the inside of the cooling unit 17 (steps S26 to S33 in FIG. 4C). Thereafter, the remaining timer charging is performed (steps S35 and S36 in FIG. 4D). Thus, the timer charging is performed in the state in which the temperature of the battery module 15 is kept at temperatures suitable for charging. Moreover, after the timer charging is completed, temperature variation of the battery module 15 is prevented, whereby the electric power charged in the battery module 15 can be used quickly after the vehicle 10 is activated next time.

In the battery pack 14 of this embodiment, the cooling unit 17, which serves as a heat insulator, cools the battery pack 14 by allowing the cooling fluid 16 to flow therethrough. In the case in which the external temperature is high and the temperature of the battery module 15 mounted on the vehicle 10 is also high, the temperature of the battery module 15 still remains high simply by thermally insulating the surroundings of the battery module 15. However, in this embodiment, the arithmetic and control unit 22 can execute the process of cooling the battery pack 14 by making the cooling fluid 16 flow to the cooling unit 17 and then draining the cooling fluid 16 and drawing gas from the cooling unit 17 (steps S26 to S32). Accordingly, in the case in which the external temperature is high and the temperature of the battery module 15 is also high, the battery module 15 can be kept cool after being cooled. Moreover, the cooling unit 17 cools the battery module 15 and serves as a heat insulator. Thus, compared with a case of separately providing a component for exchanging heat between the cooling fluid 16 and the battery module 15 and a component having a passage that serves as a heat insulator as gas is drawn therefrom, it is possible to make the battery pack 14 have a compact configuration and to reduce cost of components.

Figure 5:
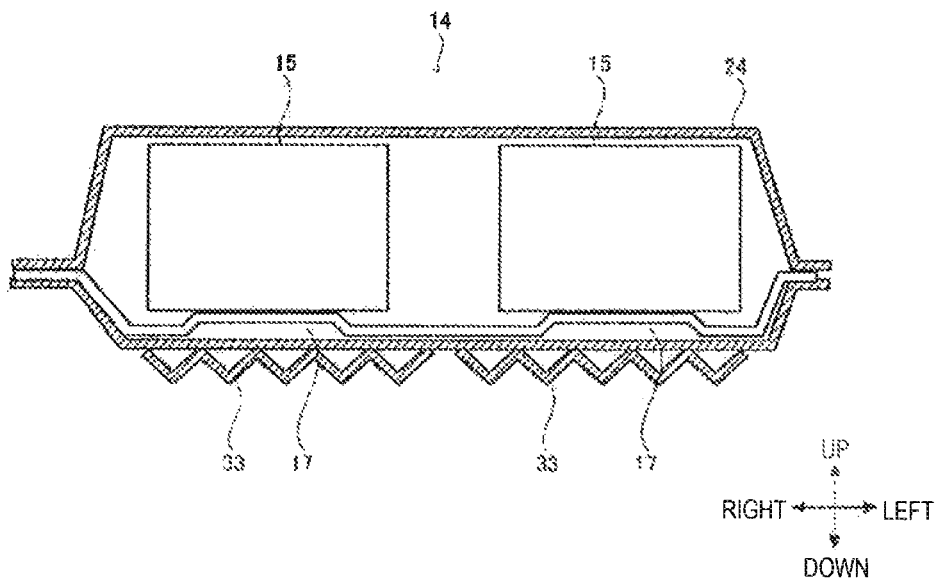
FIG. 5 is a sectional view illustrating the battery pack according to another embodiment of the disclosure.

FIG. 5 is a sectional view illustrating the battery pack 14 according to another embodiment of the disclosure. The basic configuration of this battery pack 14 is the same as that described by referring to FIG. 2, except that a heat dissipation fin 33 is provided.

The heat dissipation fin 33 is mounted at a lower surface of the battery housing case 24. The heat dissipation fin 33 is made of such as a steel plate formed into a waveform along a vehicle width direction. Herein, two battery modules 15 are contained in the battery housing case 24, and the heat dissipation fin 33 is disposed under the battery modules 15. In addition, the heat dissipation fin 33 is exposed at a lower surface of the vehicle 10.

The cooling unit 17, through which the cooling fluid 16 is to flow, is provided under the battery module 15.

This structure enhances heat dissipation characteristics of the battery module 15. That is, heat that is produced from the battery module 15 is dissipated to the outside via the cooling unit 17, the lower surface of the battery housing case 24, and the heat dissipation fin 33. This prevents overheating of the battery module 15. Furthermore, when a bottom surface of the vehicle body of the vehicle 10 comes into contact with the ground, the heat dissipation fin 33 and the cooling unit 17 serve like cushions and reduce input to the battery module 15.

Figure 6:
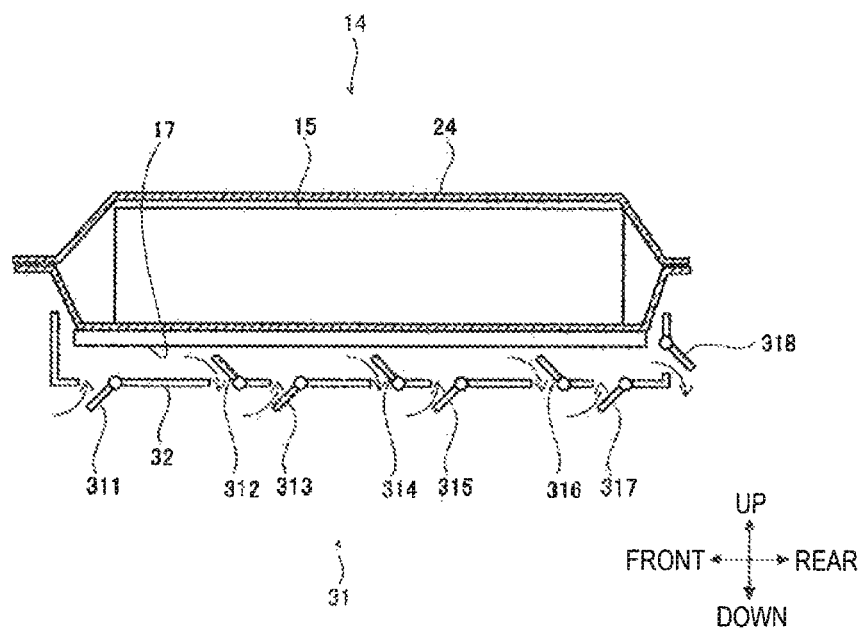
FIG. 6 is a sectional view illustrating the battery pack according to another embodiment of the disclosure.

FIG. 6 is a sectional view illustrating the battery pack 14 according to another embodiment of the disclosure. The basic configuration of this battery pack 14 is the same as that described by referring to FIG. 2, except that an open and close unit 31 is provided.

In one example, a vehicle body floor 32 is disposed under the battery pack 14, and the open and close unit 31 (open and close parts 311 to 318) is mounted to the vehicle body floor 32. Each of the open and close parts 311 to 318 is mounted to the vehicle body floor 32 in a state of being openable around a fulcrum at a rear end. Herein, the open and close parts 311, 313, 315, 317, and 318 open outward, whereas the open and close parts 312, 314, and 316 open inward.

With this structure, for example, air flows along the open and close part 311 to cool the cooling unit 17 and is then discharged to the outside of the vehicle 10 along the open and close part 312. Thus, while the vehicle 10 is traveling, air that is introduced from the outside of the vehicle 10 effectively comes into contact with the lower surface of the cooling unit 17 and efficiently cools the battery module 15 in a ripple manner.

In another case in which it is not desired to make the battery module 15 exchange heat with the external air, for example, when the external temperature is high, when the battery module 15 is forcibly cooled, and when the external temperature is very low, the open and close unit 31 is closed in order to increase heat-insulating properties between the battery module 15 and the atmosphere outside the vehicle 10.

Figure 7A:
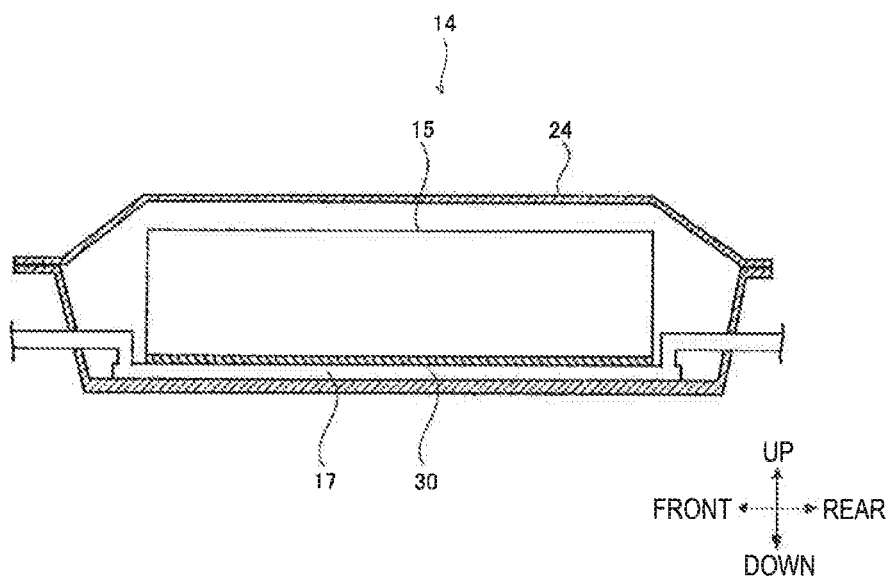
FIG. 7A is a sectional side view of the battery pack according to another embodiment of the disclosure.
Figure 7B:
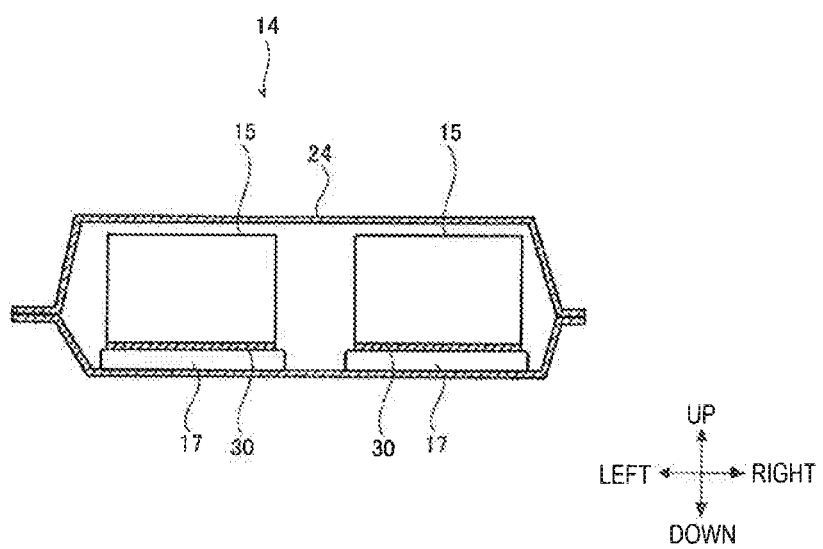
FIG. 7B is a sectional rear view of the battery pack in FIG. 7A.

FIG. 7A is a sectional side view of the battery pack 14 according to another embodiment of the disclosure. FIG. 7B is a sectional rear view of the battery pack 14 in FIG. 7A. The basic configuration of this battery pack 14 is the same as that described by referring to FIG. 2, except that a heater 30 is provided.

The heater 30 is disposed between a lower surface of the battery module 15 and an upper surface of the cooling unit 17. The heater 30 is, for example, an electric heater that generates heat by electric conduction. The heater 30 generates heat when the temperature of the battery module 15 or the external temperature is low, based on instructions from the arithmetic and control unit 22. This operation suitably increases the temperature of the battery module 15 and prevents reduction in charging and discharging characteristics. Moreover, in this case, the fluid in the inside of the cooling unit 17 is at least partially reduced, whereby the cooling unit 17 is made to serve as a heat insulating layer, and the battery module 15 is kept warm, as described later.

The battery pack 14 illustrated in FIG. 2 uses the gas pump 29, which makes the cooling unit 17 serve as a heat insulator, as a component for heating the battery module 15. This enables eliminating a dedicated component for heating the battery module 15, such as a heater. Elimination of a dedicated component makes it possible to achieve a compact configuration and reduce cost of components.

However, the battery pack 14 may include a dedicated component for heating the battery module 15, such as the heater 30, as illustrated in FIGS. 7A and 7B. Even in this configuration, in the case of heating the battery module 15 before making the cooling unit 17 serve as a heat insulator, the arithmetic and control unit 22 may heat the battery module 15 by making the gas pump 29 idle. Thereafter, the arithmetic and control unit 22 may close the first valve 25 while keeping the gas pump 29 driving, to reduce pressure in the inside of the cooling unit 17. With this operation, heating the battery module 15 and reducing pressure in the inside of the cooling unit 17 can be performed simply by control of the first valve 25 while the gas pump 29 is driven. Thus, it is possible to simplify the control processing.

Figure 8:
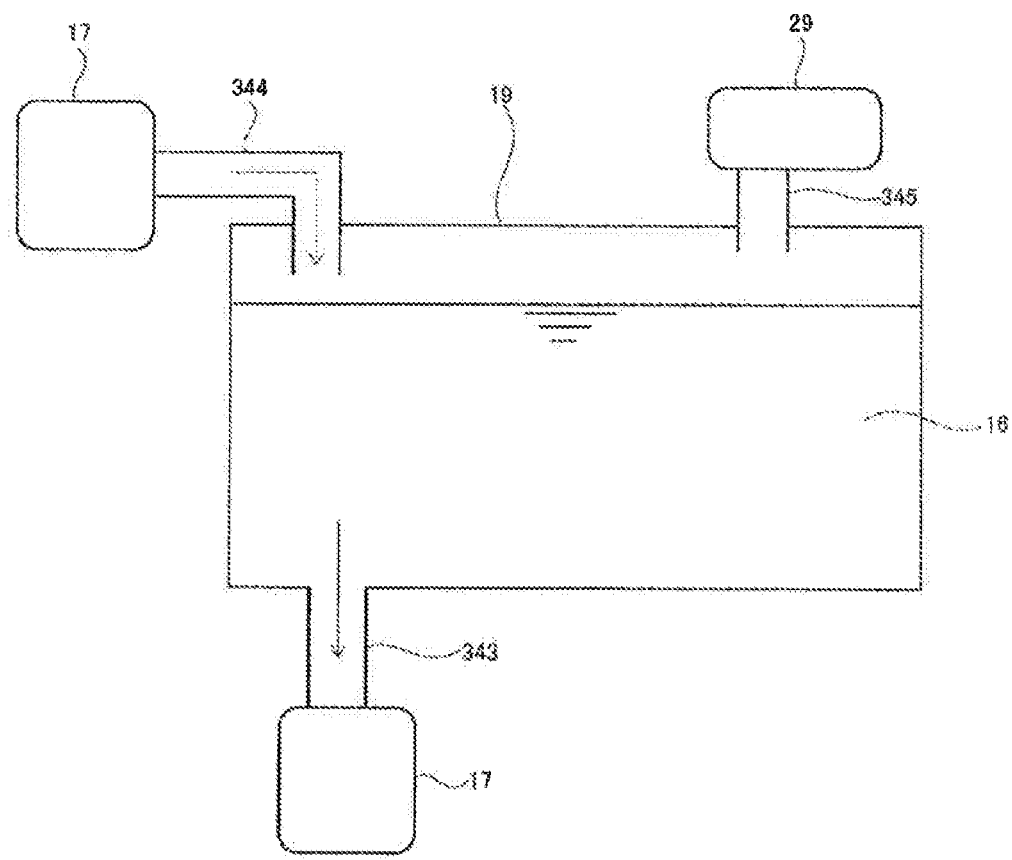
FIG. 8 is a schematic drawing illustrating a configuration of a reservoir tank and the surrounding components of the battery pack according to another embodiment of the disclosure.

FIG. 8 is a schematic drawing illustrating a configuration of the reservoir tank 19 and the surrounding components.

The fluid path 345, which couples the gas pump 29 and the reservoir tank 19, is coupled to the reservoir tank 19 from an upper surface, and a lower end of the fluid path 345 is configured so as to not come into contact with a liquid surface of the cooling fluid 16. This configuration prevents the cooling fluid 16 from entering the gas pump 29.

The fluid path 344, through which the cooling fluid 16 flows from the cooling unit 17 to the reservoir tank 19, is coupled to the reservoir tank 19 from the upper surface.

The fluid path 343, through which the cooling fluid 16 flows from the reservoir tank 19 to the cooling unit 17, is coupled to a bottom surface of the reservoir tank 19.

With this configuration, when being drained by the gas pump 29, the cooling fluid 16 flows from the cooling unit 17 into the reservoir tank 19 via the fluid path 344. In the case in which all of the cooling fluid 16 stored in the cooling unit 17 is transferred to the reservoir tank 19, the liquid surface of the cooling fluid 16 does not come into contact with the lower end of the fluid path 345, which prevents the cooling fluid 16 from entering the gas pump 29.

The above describes the embodiments of the disclosure. However, the disclosure is not limited to the foregoing embodiments. In one example, although the cooling fluid 16 is cooled by the chiller 28 in FIG. 2, a radiator may also be employed instead of the chiller 28. In the foregoing embodiments, an example of the cooling unit 17 serving as a heat insulator is described. However, the battery pack according to the disclosure may include a cooling unit in which a cooling fluid flows, and a passage unit that serve as a heat insulator as the inside is reduced in pressure, in a separate manner. Alternatively, the battery pack according to the disclosure may have a passage unit that serve as a heat insulator as the inside is reduced in pressure, while not having a cooling unit in which a cooling fluid flows. The foregoing embodiments show an example of performing the first and second temperature regulating processes in response to operation for terminating the system of the vehicle or in response to passing the start time of the timer charging. However, the first and second temperature regulating processes may be performed during other periods of time, such as while the vehicle is traveling or is stopped. Other details described in the embodiments may be modified or altered as desired, without departing from the gist of the disclosure.

In the disclosure, the arithmetic and control unit drives the gas pump while the first valve is not shut off, whereby the gas pump idles by the electric power of the battery to discharge the battery, resulting in heating the battery. Thereafter, the arithmetic and control unit switches the first valve to a shut off state to cause the gas pump to draw gas from the passage unit. This enhances heat-insulating properties of the passage unit and enables keeping the battery warm. Thus, the battery in a low temperature state is heated before being kept warm. Moreover, the gas pump, which imparts heat-insulating properties to the passage unit, can also be used as a component for heating the battery.

The arithmetic and control unit 22 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the arithmetic and control unit 22 illustrated in FIG. 3. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the arithmetic and control unit 22 illustrated in FIG. 3.

The invention claimed is:

1. A battery pack for a battery to be mounted on a vehicle, the battery pack comprising:
   a passage unit disposed on at least one side of the battery, the passage unit being configured to allow fluid to flow through an inside of the passage unit;
   a gas pump configured to operate with electric power of the battery, the gas pump being configured to draw gas in the inside of the passage unit;
   a first valve configured to shut off a fluid passage through which the gas is to be supplied to the inside of the passage unit; and
   an arithmetic and control unit configured to control the gas pump and the first valve, wherein
   the arithmetic and control unit is configured to perform a first temperature regulating process, the first temperature regulating process comprising
      driving the gas pump while the first valve is not shut off such that the gas pump draws the gas into the inside of the passage unit while the fluid is being removed from the passage unit, and, while the first valve is not shut off, also operating the gas pump to heat the battery to a predetermined temperature level, and then,
      drawing the gas out from the inside of the passage unit by switching the first valve to a shut off state.

2. The battery pack according to claim 1, further comprising:
   a second valve configured to shut off a fluid passage that couples the gas pump and the inside of the passage unit, wherein
   the first temperature regulating process further comprises shutting off the second valve after drawing the gas from the inside of the passage unit.

3. A battery pack for a battery to be mounted on a vehicle, the battery pack comprising:
   a passage unit disposed on at least one side of the battery, the passage unit being configured to allow fluid to flow through an inside of the passage unit;
   a gas pump configured to operate with electric power of the battery, the gas pump being configured to draw gas in the inside of the passage unit;
   a first valve configured to shut off a fluid passage through which the gas is to be supplied to the inside of the passage unit; and
   an arithmetic and control unit configured to control the gas pump and the first valve, wherein
   the arithmetic and control unit is configured to perform a first temperature regulating process, the first temperature regulating process comprising
      driving the gas pump while the first valve is not shut off and then,
      drawing the gas from the inside of the passage unit by switching the first valve to a shut off state, and wherein
   the vehicle comprises:
      a relay configured to disconnect the battery from a power line of the vehicle; and
      a capacitor coupled to the power line,
   the gas pump is to be coupled to the power line, and
   the arithmetic and control unit is configured to start or keep driving the gas pump in a case where the relay is switched to a disconnected state.

4. The battery pack according to claim 2, wherein the vehicle comprises:
   a relay configured to disconnect the battery from a power line of the vehicle; and
   a capacitor coupled to the power line, the gas pump is to be coupled to the power line, and the arithmetic and control unit is configured to start or keep driving the gas pump in a case where the relay is switched to a disconnected state.

5. The battery pack according to claim 1, wherein the arithmetic and control unit is configured to execute the first temperature regulating process only after the battery is charged to a level equal to or more than a state of charge that is determined by the arithmetic and control unit to be sufficient to carry out the first temperature regulating process.

6. The battery pack according to claim 2, wherein the arithmetic and control unit is configured to execute the first temperature regulating process only after the battery is charged to a level equal to or more than a state of charge that is determined by the arithmetic and control unit to be sufficient to carry out the first temperature regulating process.

7. The battery pack according to claim 3, wherein the arithmetic and control unit is configured to execute the first temperature regulating process only after the battery is charged to a level equal to or more than a state of charge that is determined by the arithmetic and control unit to be sufficient to carry out the first temperature regulating process.

8. The battery pack according to claim 4, wherein the arithmetic and control unit is configured to execute the first temperature regulating process only after the battery is charged to a level equal to or more than a state of charge that is determined by the arithmetic and control unit to be sufficient to carry out the first temperature regulating process.

9. The battery pack according to claim 1, further comprising:
a fluid pump configured to cause cooling fluid flow to the passage unit, wherein
the arithmetic and control unit is configured to execute a second temperature regulating process, the second temperature regulating process comprising
making the cooling fluid flow to the inside of the passage unit by driving the fluid pump, and then
draining the cooling fluid and drawing the gas from the inside of the passage unit by driving the gas pump.

10. The battery pack according to claim 2, further comprising:
a fluid pump configured to cause cooling fluid flow to the passage unit, wherein
the arithmetic and control unit is configured to execute a second temperature regulating process, the second temperature regulating process comprising
making the cooling fluid flow to the inside of the passage unit by driving the fluid pump, and then
draining the cooling fluid and drawing the gas from the inside of the passage unit by driving the gas pump.

11. The battery pack according to claim 3, further comprising:
a fluid pump configured to cause cooling fluid flow to the passage unit, wherein
the arithmetic and control unit is configured to execute a second temperature regulating process, the second temperature regulating process comprising
making the cooling fluid flow to the inside of the passage unit by driving the fluid pump, and then
draining the cooling fluid and drawing the gas from the inside of the passage unit by driving the gas pump.

12. The battery pack according to claim 4, further comprising:
a fluid pump configured to cause cooling fluid flow to the passage unit, wherein
the arithmetic and control unit is configured to execute a second temperature regulating process, the second temperature regulating process comprising
making the cooling fluid flow to the inside of the passage unit by driving the fluid pump, and then
draining the cooling fluid and drawing the gas from the inside of the passage unit by driving the gas pump.

13. The battery pack according to claim 5, further comprising:
a fluid pump configured to cause cooling fluid flow to the passage unit, wherein
the arithmetic and control unit is configured to execute a second temperature regulating process, the second temperature regulating process comprising
making the cooling fluid flow to the inside of the passage unit by driving the fluid pump, and then
draining the cooling fluid and drawing the gas from the inside of the passage unit by driving the gas pump.

14. The battery pack according to claim 6, further comprising:
a fluid pump configured to cause cooling fluid flow to the passage unit, wherein
the arithmetic and control unit is configured to execute a second temperature regulating process, the second temperature regulating process comprising
making the cooling fluid flow to the inside of the passage unit by driving the fluid pump, and then
draining the cooling fluid and drawing the gas from the inside of the passage unit by driving the gas pump.

15. The battery pack according to claim 7, further comprising:
a fluid pump configured to cause cooling fluid flow to the passage unit, wherein
the arithmetic and control unit is configured to execute a second temperature regulating process, the second temperature regulating process comprising
making the cooling fluid flow to the inside of the passage unit by driving the fluid pump, and then
draining the cooling fluid and drawing the gas from the inside of the passage unit by driving the gas pump.

16. The battery pack according to claim 8, further comprising:
a fluid pump configured to cause cooling fluid flow to the passage unit, wherein
the arithmetic and control unit is configured to execute a second temperature regulating process, the second temperature regulating process comprising
making the cooling fluid flow to the inside of the passage unit by driving the fluid pump, and then
draining the cooling fluid and drawing the gas from the inside of the passage unit by driving the gas pump.

17. A battery pack for a battery to be mounted on a vehicle, the battery pack comprising:
a passage unit disposed on at least one of sides of the battery, the passage unit being configured to allow fluid to flow through an inside of the passage unit;
a gas pump configured to operate with electric power of the battery, the gas pump being configured to draw gas in the inside of the passage unit;
a first valve configured to shut off a fluid passage through which the gas is to be supplied to the inside of the passage unit; and circuitry configured to
control the gas pump and the first valve, wherein
the circuitry is configured to perform a first temperature regulating process, the first temperature regulating process comprising
driving the gas pump while the first valve is not shut off until a predetermined heated battery temperature level is reached due to the driving of the gas pump, and then,
drawing the gas from the inside of the passage unit by switching the first valve to a shut off state, and then shutting a second valve after a period of drawing the gas from the inside of the passage unit with the period of drawing being designed to achieve a heat insulating effect that insulates the battery following attainment of the predetermined heated battery temperature level.

18. The battery pack according to claim 17, wherein the vehicle comprises:
a relay configured to disconnect the battery from a power line of the vehicle; and
a capacitor coupled to the power line,
the gas pump is to be coupled to the power line, and
the circuitry is further configured to start or keep driving the gas pump in a case where the relay is switched to a disconnected state.

19. The battery pack according to claim 17, wherein the gas drawn by the gas pump is different than the fluid removed from the inside of the passage unit, and wherein driving the gas pump while the first valve is not shut off also draws the gas into the inside of the passage unit while the fluid is being removed from the passage unit.

20. The battery pack according to claim 17, wherein the circuitry is further configured to shut a second valve after a period of drawing the gas from the inside of the passage unit with the period of drawing being suited to achieve a heat insulating effect that insulates the battery following attainment of the predetermined heated battery temperature level.

21. The battery pack according to claim 1, wherein the gas drawn by the gas pump is different than the fluid removed from the inside of the passage unit.

* * * * *